Patented Sept. 30, 1924.

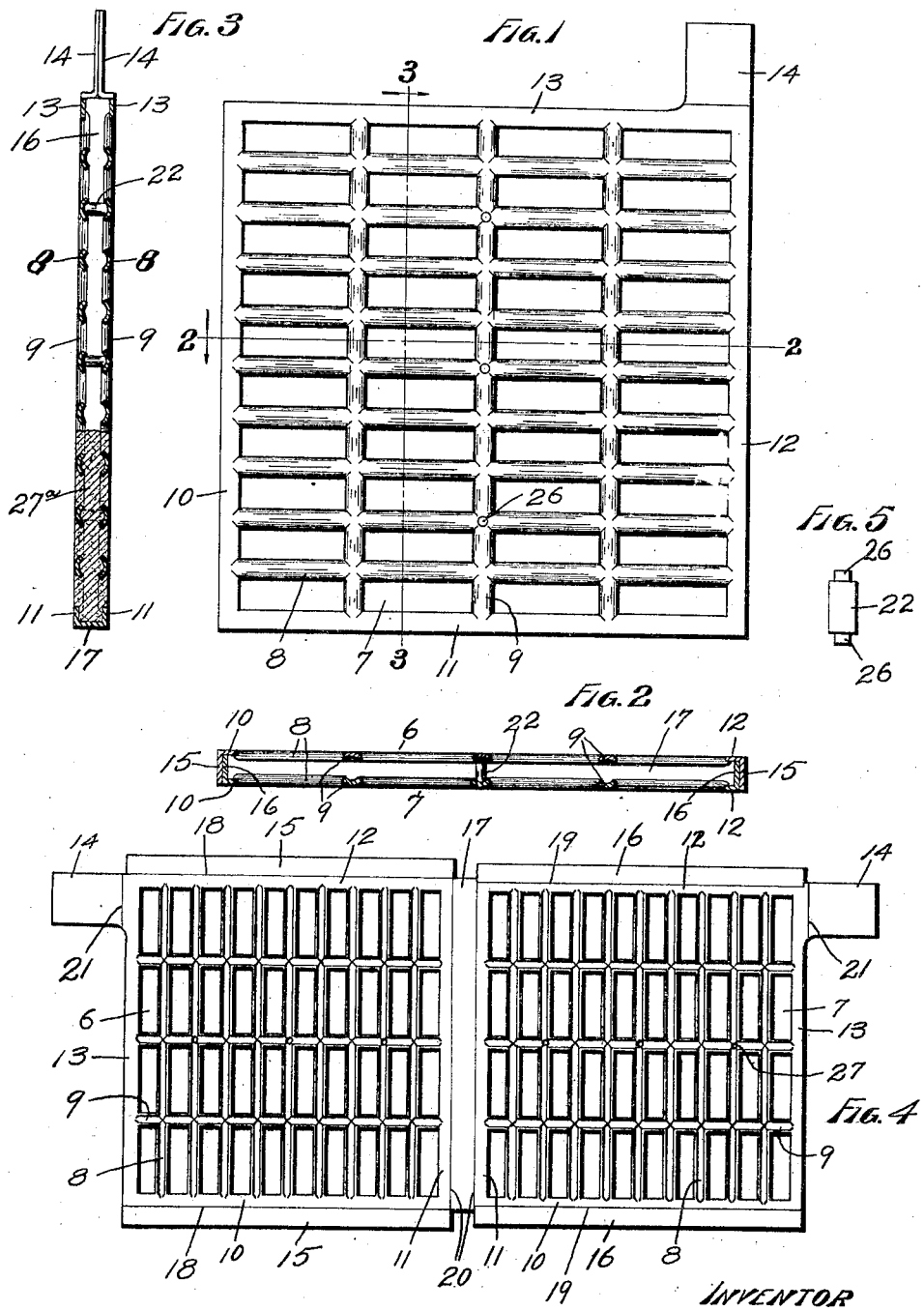

1,509,992

UNITED STATES PATENT OFFICE.

JAMES M. ALLEN, OF ST. LOUIS, MISSOURI, ASSIGNOR TO JAMES M. ALLEN, FRED P. SMITH, AND FREDERICK D. TUCKER, AS TRUSTEES FOR THE SMITH-ALLEN BATTERY COMPANY, OF ST. LOUIS, MISSOURI.

ELECTRODE OR GRID FOR STORAGE BATTERIES.

Application filed October 6, 1920. Serial No. 415,020.

*To all whom it may concern:*

Be it known that I, JAMES M. ALLEN, a citizen of the United States, and resident of the city of St. Louis and State of Missouri, have invented certain new and useful Improvements in Electrodes or Grids for Storage Batteries, of which the following is a specification containing a full, clear, and exact description, references being had to accompanying drawings, forming a part thereof.

My invention relates to improvements in electrodes or grids for storage batteries and has for its primary object an electrode which is stamped and bent out of a single piece of material so that it will be closed on three edges, open on the top and both sides provided with a grill.

A further object is to construct an electrode for secondary batteries out of a single sheet of material in which the ribs forming the grid are made concavo-convex, thus stiffening the grid and allowing thin material to be used.

In the drawings:

Fig. 1 is a side elevation of my device.

Fig. 2 a horizontal cross section taken on the line 2—2 of Fig. 1.

Fig. 3 a vertical cross section taken on the line 3—3 of Fig. 1, and showing a portion of the active material in position therein.

Fig. 4 is a plan of the electrode as it appears when stamped out.

Fig. 5 an elevation of one of the rivets made use of to secure the central portion of the electrode.

In the construction of my device I employ a sheet of metal, which is stamped to form the grids 6 and 7. These grids are provided with horizontal bars 8, vertical bars 9 and a frame composed of members 10, 11, 12 and 13. Formed integral with the members 13 are upwardly projecting lugs 14. These lugs acting as binding posts and are adapted to be secured in the crow's foot. When stamping my device I provide the flanges 15 and 16 which extend along the edges of the frame members 10 and 12, while the frame members 11 are connected together by the portion 17, which acts as the bottom of the electrode. During the stamping operation, the bars 8 and 9 are dished or made concavo-convex. The flanges 15 are then bent at right angles to the frame walls 10 and 12 along the lines 18, while the flanges 16 are similarly bent along the lines 19. The members 6 and 7 are bent at right angles to the bottom 17 along the lines 20. This will shape the grid as illustrated in Figs. 1 and 2, the flanges 15 lying on the outside of the flanges 16. When this is completed a hot soldering iron is run along the edges of the flanges 15 and the face of the side 7. This unites the grid into one solid or integral mass. The projections 14 are bent inwardly along the lines 21 and assume the position shown in Fig. 3, and while being secured in the crow's foot the heat of welding them therein will unite these two members so as to form a solid terminal or binding post. The same result can also be accomplished by running a heated soldering iron along the edges of the two projections 14. In order to prevent the spreading or collapsing of the central portion of the grid I make use of the rivets 22. These rivets are clearly illustrated in Fig. 5 and have their reduced portions 26 inserted through openings 27 formed in one of the vertical bars 9. After the electrode has been thus assembled the active material 27ª is placed in position and pressed securely within the grid, as will be seen in Fig. 3. This allows a large amount of the active material to be exposed to the action of the electrode, while the curvature of the bars 8 and 9 securely anchors the active material within the grid and prevents any shifting or dislodgement thereof.

Having described my invention, what I claim is:

An electrode for storage batteries formed of a single folded sheet of metal, said sheet when folded having two spaced apart sides, a bottom, and two vertical edges, said vertical edges composed of a double thickness of material, concavo-convex bars arranged vertically and horizontally formed integrally with said sides, said bars having their convex sides facing outwardly and upwardly projecting lugs formed integral with said sides.

In testimony whereof, I have signed my name to this specification.

JAMES M. ALLEN.